UNITED STATES PATENT OFFICE.

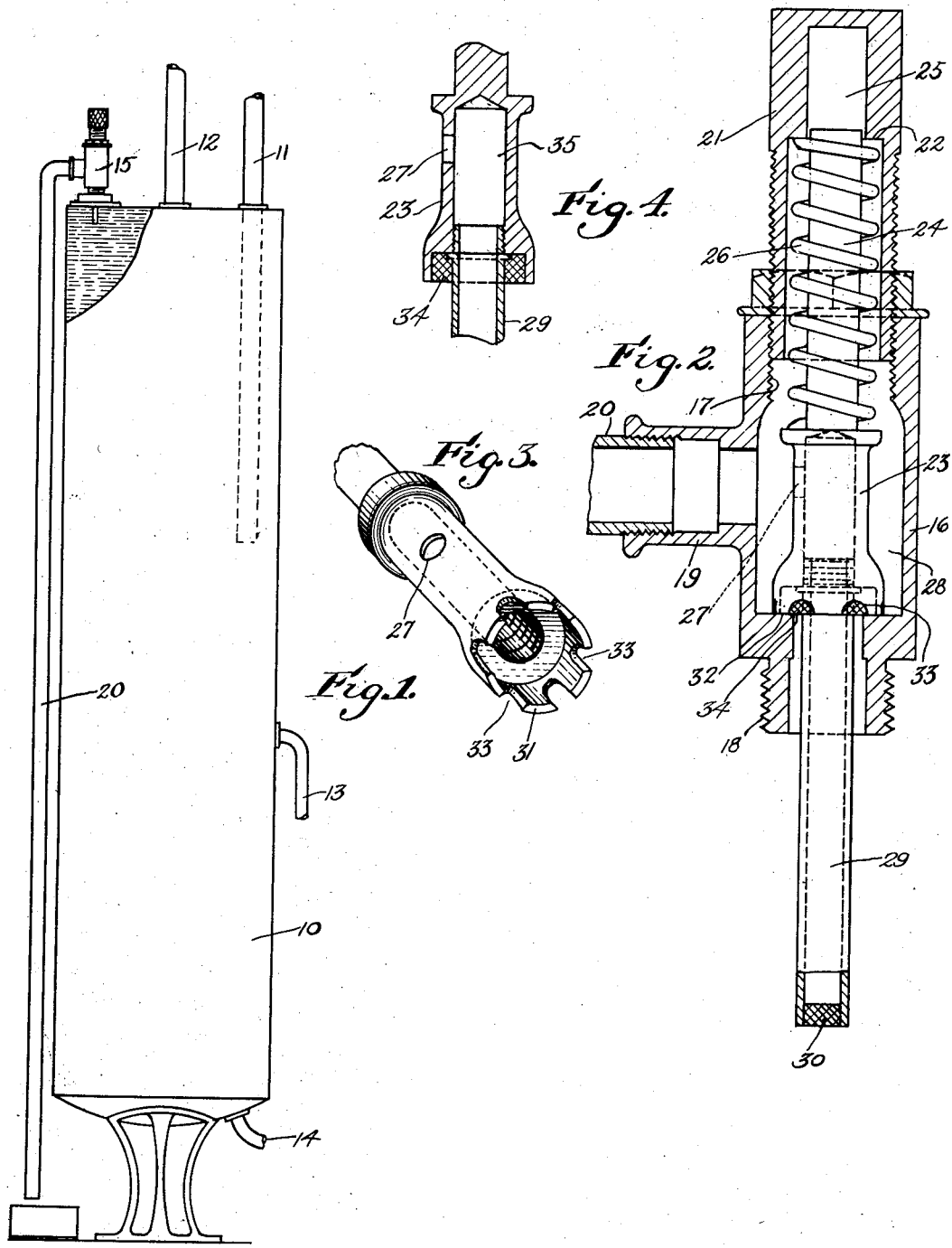

CHARLES H. SMITH, OF BOSTON, MASSACHUSETTS.

TEMPERATURE-CONTROLLED SAFETY RELIEF-VALVE FOR HOT-WATER BOILERS.

1,388,383. Specification of Letters Patent. Patented Aug. 23, 1921.

Application filed March 22, 1919. Serial No. 284,378.

*To all whom it may concern:*

Be it known that I, CHARLES H. SMITH, a citizen of the United States, residing at Boston, in the county of Suffolk and State of Massachusetts, have invented new and useful Improvements in Temperature-Controlled Safety Relief-Valves for Hot-Water Boilers, of which the following is a specification.

The object of this invention is to provide certain improvements in safety relief valves for hot water boilers, for preventing boiler explosions.

On the accompanying drawings,—

Figure 1 represents a domestic hot water boiler or storage tank equipped with a valve embodying my invention.

Fig. 2 represents a longitudinal section through the relief valve.

Fig. 3 shows the movable valve member detached.

Fig. 4 shows the connection between the tube and the movable valve member.

For the purpose of illustrating one mode of use of a valve embodying my invention, I have shown at 10 a domestic hot water tank or boiler, which is usually connected to a range or other form of water heater. The inlet and outlet pipes are indicated at 11 and 12 respectively, and at 13, 14 are the pipes which are connected to the range or gas heater.

My improved temperature-controlled safety relief valve is indicated as a whole at 15, in Fig. 1, and is shown as located at the upper end of the boiler, where the water is at the highest temperature. It may, of course, be used in connection with the heater of a hot water heating system, or with any other vertical or horizontal boiler where care is required to prevent overheating of the water or placed in the hot water service system. It consists of a tubular body 16 internally threaded at its upper end as at 17 and having a reduced threaded nipple 18 at its lower inlet end. The body has a lateral tubular outlet nipple 19 which is internally threaded to receive the threaded end of a relief pipe or outlet member 20, to permit the discharge of water entering the body.

A hollow cap 21 is screwed onto the upper threaded end of the body, and has an internal shoulder 22 for a purpose to be described.

Within the body is the movable valve member 23 provided with the stem 24 which extends into the socket 25 in the cap. A spring 26 encircles the stem and its ends bear against the shoulder 22 and the upper end of the valve. The pressure of the spring may be varied by adjusting the cap.

The valve is hollow or chambered and has a lateral outlet 27 for the discharge of water into the chamber 28 in the valve body. A pipe 29, of smaller diameter than the bore of the nipple 18, is screwed into the lower end of the valve and is of such length that its lower end extends into the boiler. The lower end of the valve is closed by a plug 30 of metal or other solid substance which will fuse at the desired temperature—say 200° F. The lower end of the valve is swelled or enlarged to provide an annular flange 31 which is normally pressed by the spring 26 against the seat 32 surrounding the inlet in the lower end of the body. Said flange has one or more notches 33 which constitute ports for the passage of water from the inlet to the chamber 28 in the body. Within the flange is a washer or packing member 34 of metal or other fusible material, which will fuse at a somewhat higher temperature than the plug 30, say 212° F., and which normally seals the ports or outlets 33.

The operation of the device is as follows: The spring, which is set to permit the valve to raise at a predetermined pressure in the heater or boiler, normally holds the valve against its seat; but, when the pressure is sufficient, the valve is raised permitting the escape of water past it into the chamber 28 and out through the pipe 20. This is the normal operation of the usual pressure-relief valve, but, owing to the carelessness or lack of knowledge of those caring for domestic heaters or boilers, it sometimes happens that the spring is so set or the parts stick that the boiler bursts before the valve yields. Hence I have preferably provided two safety devices each of which will prevent the accumulation of a dangerous temperature in the boiler. The first is the pipe 29 which preferably depends into the water and which communicates through the chamber 35 in the valve and port 27 with the chamber 28 in the valve body. When the temperature of the water is high enough to fuse the plug 30, a free outlet is provided and an internal pressure in the boiler is prevented. Should the plumber or steam fitter, in replugging the pipe 29 after a fusing of the plug, use solder or other high-fusing-point metal, then should the water in the heater reach a more dangerous heat,—say 212° F.,—the packing member of washer 34 will be fused permitting the escape of the water past the ports 33 into the chamber 28. Ordinarily the washer 34 will not be fused but will remain intact, providing those who care for the apparatus use the proper material for the plug 30. Even if a careless plumber or steam fitter should use solder for the plug 30, and a leather washer in lieu of the fusible metal washer or plug 34, there is still an opportunity, in case the spring 26 is properly set, for the valve to lift in time to prevent a boiler explosion.

My safety device is particularly applicable for use in domestic hot-water systems, either wherein hot water is supplied for radiation, or wherein water for lavatory or washing purposes is stored in a tank as shown, and especially where the water is supplied under high pressure. In such systems as ordinarily installed, the water may be heated to a relatively high temperature, without the evolution of steam, since the external pressure is greater than the vapor pressure, and a dangerous condition is thereby created, which is not covered by the employment of the usual spring-controlled relief valve. According to my invention, I have provided a single fitting or device, which may be merchandised as a unit and which provides for the relief of water from the system, either when the pressure or when the temperature is excessive. This fitting is preferably provided with a lateral outlet for connection with a pipe leading to a sink or a waste trap, so that water, when discharged, may be properly disposed of, without damage to the property. It has a tube or pipe which extends into contact with the water, and which is closed by a fusible plug constantly in contact on one face with the water, and there is no dead end in which cooler water may be trapped. In Fig. 1, this tube is shown as extending down into the water of the boiler, but it could be extended into a pipe if desired. The plug-carrying tube is shown as connected to the spring-pressed movable valve member, the spring for which is set according to the pressure under which the water is initially delivered by the service pipe. Thus, on removing the movable cover or cap section 25, the valve and the tube may be bodily removed for inspection and for replacement of the fusible plug without disturbing the water pipe or service connections. The lateral ports 33 serve as a by-pass for water from the inlet at the nipple to the interior of the body, which is, as stated, normally closed by the fusible material 34, which preferably has a higher fusing point than the plug 30, so that, if an inexperienced or careless person should replug the tube with solder or other material having a high fusing point, the material 34 will melt before a dangerous temperature is reached when the water is being heated.

Having thus explained the nature of my said invention and described a way of making and using the same, although without attempting to set forth all of the forms in which it may be made or all of the modes of its use, what I claim is:—

1. A temperature-controlled relief valve adapted for use in hot-water systems, comprising a body or casing having a lateral threaded outlet nipple, a threaded inlet nipple at one end, and a threaded removable cap at the other end, in combination with a relief member normally closing said inlet to the entrance of water and having a tube projecting through said nipple and a plug of fusible material sealing the end of said tube, said parts being arranged and related whereby, when the inlet nipple is screwed into a hot-water container, the plugged end of the tube will project into the hot water therein, and whereby, on removing said cap, said member and tube may be removed without detaching said body or casing from said hot-water container.

2. The combination with a boiler, of a temperature-controlled relief valve comprising a body having an inlet and an outlet, a yieldingly seated chambered valve therein having an outlet port communicating with the interior of the body and normally closing said inlet, a pipe connected with the valve to communicate with the chamber therein and having an open end projecting from the valve body and immersed in the water of said boiler, and a plug of fusible metal normally closing said end of said pipe, whereby the boiler may be relieved through said body under conditions of excessive pressure or temperature.

3. The combination with a hot water container, of a temperature-controlled relief valve comprising a body having an inlet, an outlet and an interposed valve seat, a movable valve associated with said seat and having a passage therethrough for the passage of water from said inlet into the body, a fusible plug exposed to the water of said container and normally closing the passage through said valve, and a relief spring holding said valve against its seat, whereby relief of water is afforded under conditions of excessive pressure or temperature.

4. A temperature-controlled relief valve comprising a body having an outlet, a nipple for connection with a source of hot water and an internal valve seat, a valve within said body having a passageway and exposed to the pressure of the water from the source, a spring for holding said valve against said seat, a pipe connected to said valve to communicate with the passageway therein, and a plug of low-fusing-point material sealing said pipe.

5. A temperature-controlled relief valve comprising a body having an outlet and an inlet, with a valve seat interposed therebetween, a valve associated with said seat to cut off the flow of water into said body, a spring normally holding said valve against its seat, a pipe connected to and movable with said valve and extending through said seat, and a plug of fusible material closing said pipe, said valve having a passage leading from said pipe to the interior of said body, whereby, when said plug is melted, water may pass through said pipe and valve into and out from said body.

6. A temperature-controlled relief valve comprising a body having an inlet and an outlet with an interposed valve seat, a spring-seated chambered valve associated with said seat and having an outlet port leading into said body, an open end pipe connected to said valve to communicate with the chamber therein to permit the passage of water through said valve and body, and a fusible plug normally closing the end of said pipe, said parts being arranged to afford relief under conditions of excessive temperature or pressure.

7. A temperature-controlled relief valve comprising a body having a threaded inlet nipple at one end, a lateral threaded outlet nipple, and a valve seat encircling the inlet, a removable cap at the other end of said body, a valve associated with said seat to cut off the flow of water into the body and having a passage therethrough, a spring operating against said valve to hold it on its seat, a tube communicating with said passage in said valve and extending into said inlet, and a plug of fusible material normally closing said tube.

8. A temperature-controlled relief valve comprising a body having an inlet, an outlet and an intermediate valve seat, a chambered valve opening into said body to permit the flow of water into said body, a spring bearing normally against said valve to hold it against its seat, a fusible plug normally preventing the passage of water through said valve, a by-pass for water from said inlet into said body, and fusible material normally closing said by-pass and exposed to water entering said inlet.

9. A temperature-controlled relief valve comprising a body or casing having a relief outlet, a threaded end with an inlet therethrough, and a valve seat encircling said inlet, a valve within said body having an annular flange for engaging said seat, said flange having lateral outlet ports, and a fusible washer carried by said valve within said flange and normally closing said outlet ports, and a spring normally holding said valve against its seat, all so arranged whereby water may escape through said body either when said valve is lifted by excess pressure or when said washer is melted by excessive temperature.

10. A temperature-controlled relief valve comprising a body having an outlet, a tubular nipple at one end for connection with the boiler, and an internal valve seat encircling the bore of the nipple, a chambered valve within the body having a port communicating with the interior of said body, a pipe extending from said valve through the nipple and having a plug of low-fusing point material normally sealing it, said valve having an apertured flange, and a packing or washer of higher-fusing-point material within said flange normally engaging said valve seat.

11. A combined temperature-controlled and pressure relief valve comprising a body having an outlet, a tubular nipple at one end for connection with the boiler, and an internal valve seat encircling the bore of the nipple, a chambered valve within the body having a port communicating with the interior of said body, a pipe extending from said valve through the nipple and having a plug of low-fusing-point material normally sealing it, said valve having an apertured flange, a washer of higher-fusing-point material within said flange normally engaging said valve seat, an adjustable cap at the end of said body opposite said nipple, and a spring between said cap and said valve for holding said valve and washer against said seat to permit said valve to yield under pressure.

In testimony whereof I have affixed my signature.

CHARLES H. SMITH.